(12) United States Patent
Schuermann

(10) Patent No.: US 9,914,664 B2
(45) Date of Patent: Mar. 13, 2018

(54) METHOD FOR DENITRIFICATION OF BYPASS EXHAUST GASES IN A PLANT FOR PRODUCING CEMENT CLINKER

(71) Applicant: KHD Humboldt Wedag GmbH, Cologne (DE)

(72) Inventor: Heiko Schuermann, Leverkusen (DE)

(73) Assignee: KHD Humboldt Wedag GmbH, Cologne (DE)

( * ) Notice: Subject to any disclaimer, the term of this patent is extended or adjusted under 35 U.S.C. 154(b) by 0 days.

(21) Appl. No.: 15/027,626

(22) PCT Filed: Oct. 6, 2014

(86) PCT No.: PCT/EP2014/071317
§ 371 (c)(1),
(2) Date: Jul. 11, 2016

(87) PCT Pub. No.: WO2015/052123
PCT Pub. Date: Apr. 16, 2015

(65) Prior Publication Data
US 2016/0347657 A1  Dec. 1, 2016

(30) Foreign Application Priority Data

Oct. 8, 2013 (DE) .......... 10 2013 016 701

(51) Int. Cl.
*C04B 7/43* (2006.01)
*B01D 53/86* (2006.01)
(Continued)

(52) U.S. Cl.
CPC .......... *C04B 7/365* (2013.01); *B01D 53/8628* (2013.01); *B01D 53/8631* (2013.01);
(Continued)

(58) Field of Classification Search
CPC .......... B01D 53/8628; B01D 2258/012; B01D 2255/1025; B01D 2251/2062;
(Continued)

(56) References Cited

U.S. PATENT DOCUMENTS 3,638,400 A * 2/1972 Heilmann ................ C04B 7/60
209/12.2
5,951,279 A 9/1999 Hunold et al.
(Continued)

FOREIGN PATENT DOCUMENTS

DE 4313479 6/1994
DE 19652740 6/1998
(Continued)

OTHER PUBLICATIONS

International Search Report, dated Feb. 9, 2015, priority document.

*Primary Examiner* — Anthony J Zimmer
*Assistant Examiner* — Syed Iqbal
(74) *Attorney, Agent, or Firm* — Greer, Burns & Crain, Ltd.

(57) ABSTRACT

Denitrifying bypass exhaust gases in a cement clinker producing plant. The plant comprises a rotary kiln connected to a calciner for the deacidification of raw material or to a rotary kiln riser shaft via a rotary kiln inlet chamber, and the bypass exhaust gas being drawn off in the region of the rotary kiln inlet chamber. The method comprises: cooling the bypass gas to between 260 C and 400 C in a cooling device, injecting an ammonia-, urea-, and/or ammonium-containing substance into the cooled bypass gas, introducing the cooled and mixed bypass gas into a ceramic filter system to filter out any halide and sulfate of the alkali metals and alkaline-earth metals precipitated during cooling the gas, and any nitrogen not reacted by the injected substances is chemically selectively reduced over a catalytic converter (Continued)

which is located in or directly downstream of the ceramic filter system.

14 Claims, 3 Drawing Sheets

(51) Int. Cl.
  *F27B 7/20* (2006.01)
  *C04B 7/36* (2006.01)
  *F27D 17/00* (2006.01)
  *B01D 53/90* (2006.01)
  *C04B 7/60* (2006.01)

(52) U.S. Cl.
  CPC ......... *B01D 53/8668* (2013.01); *B01D 53/90* (2013.01); *C04B 7/43* (2013.01); *C04B 7/60* (2013.01); *F27B 7/20* (2013.01); *F27D 17/008* (2013.01); *B01D 2251/206* (2013.01); *B01D 2251/2062* (2013.01); *B01D 2251/2065* (2013.01); *B01D 2251/2067* (2013.01); *B01D 2255/20707* (2013.01); *B01D 2255/20723* (2013.01); *B01D 2255/20776* (2013.01); *B01D 2255/915* (2013.01); *B01D 2257/404* (2013.01); *B01D 2258/0233* (2013.01)

(58) Field of Classification Search
  CPC ........ B01D 2255/1021; B01D 53/9472; B01D 53/9418; B01D 2255/2063; B01D 53/9422; B01D 2255/102; B01D 53/9431; B01D 53/944; B01D 2255/202; B01D 2255/9155; B01D 2255/2065; B01D 2255/204; B01D 53/9468; B01D 53/949; B01J 27/053; B01J 35/04; Y02T 10/24; F01N 3/035; F01N 3/0222; F01N 2330/06; F01N 2510/0682; F01N 2370/22; F01N 3/0231; F01N 2510/06; F01N 2251/2062
  See application file for complete search history.

(56) References Cited

U.S. PATENT DOCUMENTS

2003/0105381 A1    6/2003  Eckert et al.
2004/0175315 A1*   9/2004  Brisley ............. B01D 53/9431
                                              423/239.1

FOREIGN PATENT DOCUMENTS

DE    19718259         11/1998
DE    10158968          6/2003
EP     0682974         11/1995
EP     0682974 A2  *  11/1995   ......... B01D 53/8628

* cited by examiner

METHOD FOR DENITRIFICATION OF BYPASS EXHAUST GASES IN A PLANT FOR PRODUCING CEMENT CLINKER

CROSS-REFERENCES TO RELATED APPLICATIONS

This application claims the benefit of the German patent application No. 10 2013 016 701.9 filed on Oct. 8, 2013, the entire disclosures of which are incorporated herein by way of reference.

BACKGROUND OF THE INVENTION

The invention relates to a process for the denitrification of bypass exhaust gases in a plant for producing cement clinker, where the plant has, in the gas flow direction, a rotary tube furnace for sintering of the cement clinker, and where the rotary tube furnace is connected via a rotary tube furnace inlet chamber to a calciner for deacidification of raw meal or to a rotary tube furnace riser shaft, and where the bypass exhaust gas is taken off in the region of the rotary tube furnace inlet chamber.

To produce cement, silicate- ($SiO_4^{4-}$) and carbonate-containing ($CO_3^{2-}$) rock is milled, formally freed of carbon dioxide ($CO_2$) by deacidification of the carbonate ($CO_3^{2-}$) to the oxide (—O) (in the form of quicklime, CaO) at elevated temperature and, in a subsequent step, the mixture composed of silicate-containing ($SiO_4^{4-}$) and carbonate-containing ($CO_3^{2-}$) raw meal is sintered at elevated temperature in a rotary tube furnace to give cement clinker (a mixed crystal composed of calcium silicates of various stoichiometries). Sintering takes place at comparatively high temperatures which range up to 1450° C. To generate these high temperatures in a rotary tube furnace, burner flames which have a temperature of from 1800° C. to up to 2000° C. are necessary in the rotary tube furnace. At these high temperatures, nitrogen oxides ($NO_x$) are formed by combustion of the nitrogen ($N_2$) present in atmospheric air. Apart from the combustion of atmospheric nitrogen ($N_2$), a further nitrogen oxide source may be present in the fuel used for generating heat in the rotary tube furnace. This is generally present as chemically bound nitrogen (R—N), for example as amines (R—$NH_2$) in organic secondary fuels. Nitrogen oxides ($NO_x$) disproportionate in the presence of moisture from the atmospheric air to form various oxoacids of nitrogen having different stoichiometries. These oxoacids of nitrogen are the cause of undesirable acid rain which, in large quantities, undesirably decreases the pH of forest soils and soils of agricultural land and thereby very greatly decreases the resistance of trees and plants to diseases. Note therefore has to be taken of legal obligations for avoiding nitrogen oxide emissions, and these are becoming ever stricter. This means that the absolute emissions always have to be reduced further.

It is not only the emission of nitrogen oxides ($NO_x$) which is an undesirable problem in the production of cement. Apart from nitrogen oxide emission, it is also necessary to keep the cement clinker free of halides ($F^-$, $Cl^-$, $I^-$) and sulfates ($SO_4^{2-}$). The halides ($F^-$, $Cl^-$, $I^-$), in particular the chlorides ($Cl^-$), and the sulfates ($SO_4^{2-}$) of the alkali metals (Li, Na, K) and alkaline earth metals (Mg, Ca) have a strong adverse effect on the properties of the cement to be produced from the cement clinker. The alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) cause condensation problems in the rotary furnace inlet chamber. The alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) go over into the gas space at appropriately high temperatures in the rotary tube furnace, which firstly exercises a desirable purifying effect on the cement clinker during the sintering thereof. When the hot burner gases go over into a calciner or into a rotary tube furnace riser shaft, where the temperature of the rotary tube furnace exhaust gas decreases abruptly as a result of the transfer of the heat present in the rotary tube furnace exhaust gas to the endothermic deacidification reaction of the carbonate ($CO_3^{2-}$) to form quicklime (CaO), the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkali earth metal sulfates ($Li_2SO_4$, $Na_2SO_4$, $K_2SO_4$, $MgSO_4$, $CaSO_4$) condense and, on further cooling, solidify and produce caked material on the walls of the rotary tube furnace inlet chamber, which can ultimately block the plant completely.

To remove the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) from the process, DE 197 18 259 A2 teaches taking off a gas substream as bypass exhaust gas from the rotary tube furnace inlet chamber and separate off the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) in a separator. The remaining gas is, after being completely freed of dust, released into the free atmosphere. It is precisely these gases which still contain a high proportion of nitrogen oxides ($NO_x$). As plants for producing cement are becoming ever larger, the amounts of gas and the amounts emitted are becoming so great that emission into the free atmosphere is no longer tolerable.

A third emission which has to be avoided is the emission of undesirable chlorinated and polychlorinated dibenzodioxins, often referred to colloquially and in simplified form as "dioxins," accompanying the dust-free exhaust air from the bypass exhaust gases, and the emission of undesirable chlorinated and polychlorinated dibenzofurans, often referred to colloquially and in simplified form as "furans."

Dioxins and furans are formed spontaneously in combustion processes in the presence of carbon (C), halogens ($F_2$, $Cl_2$, $I_2$) and oxygen ($O_2$). When secondary fuels whose burning behavior is difficult to control are used, the combustion can take place to only an unsatisfactory extent with, for example, halogen-containing solvents also forming halogen oxides in the event of incomplete combustion and these oxides decomposing at the temperature of the rotary tube furnace and thereby allowing free halogen ($Cl_2$) to be formed. However, owing to the very high temperatures in a rotary tube furnace, dioxin and furan formation is not to be expected in the rotary tube furnace, so that rotary tube furnace exhaust gases and bypass exhaust gases should be free of dioxins and furans. Nevertheless, the electrostatic dust filters which are frequently used for removing dust from bypass exhaust gases sometimes tend to generate electric arcs because of the high static charge and can in the presence of halogens ($F_2$, $Cl_2$, $I_2$) produce not only carbon compounds and oxygen ($O_2$) but also dioxins and furans; halogens ($F_2$, $Cl_2$, $I_2$), especially chlorine ($Cl_2$), originate, as mentioned above, from the combustion of secondary fuels or are introduced with the raw meal. The dioxins and the furans are formed at moderate temperatures in the dust precipitator from carbon monoxide (CO), carbon dioxide ($CO_2$) present in the bypass exhaust gas, possibly from soot ($C_x$) and from chlorine ($Cl_2$) in combination with atmospheric oxygen ($O_2$). Dioxins and furans are formed, despite their comparatively complex structure, spontaneously under these conditions.

Thus, alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$), nitrogen oxides ($NO_x$) and also dioxins and furans are formed in the process. These materials have to be removed from the process and should not go into the free atmosphere.

DE 101 58 968 A2 proposes blowing the bypass exhaust gases which possibly contain dioxins and furans as a result of dust removal as cooling air into the recuperation zone back into the recuperation region of a clinker cooler which follows the rotary tube furnace in order to quench the freshly sintered cement clinker. From there, the dioxin- and furan-containing bypass exhaust gases are blown back as secondary air into the rotary tube furnace in the process and the dioxins and furans are burned at the temperature of the rotary tube furnace. In the case of large plants for producing cement, the amounts of the bypass exhaust gases to be treated are so large that simple recirculation to the recuperation region of the clinker cooler leads to further problems. The recirculated bypass exhaust gases are low in oxygen as a result of the single or multiple passage through the circuit within the plant for producing cement. If the entire bypass exhaust gases were to be circulated, a low-oxygen and, as a result of combustion, carbon dioxide-rich atmosphere would be formed in the plant as a result of oxygen consumption due to combustion; this atmosphere is finally so low in oxygen and rich in carbon dioxide that it can no longer be employed as secondary air for the burner in the rotary tube furnace.

Avoidance of dioxins and furans by circulation of bypass exhaust gases thus leads to new problems which have to be overcome.

In addition, there are, in the prior art, processes for mixing the bypass exhaust gases with the exhaust gases from a heat exchanger which is located downstream of the calciner or downstream of the rotary tube furnace riser shaft in the gas flow direction. In this way, the concentrations of undesirable emissions permitted by law, here especially the concentration of nitrogen oxides ($NO_x$), in the total exhaust gas from the plant for producing cement are reduced by dilution. However, this process does not lead to a reduction in the absolute amounts of the actual emissions. Furthermore, legislators are in future also expected to pass emission regulations which prohibit plant operators from diluting undesirable emissions.

Avoidance of nitrogen oxides, dioxins and furans by mixing the bypass exhaust gases with other gases given off from the process is thus also not an acceptable route.

One process which is known for denitrifying the total exhaust gases from a plant for producing cement is the SNCR (selective noncatalytic reduction) process. In this process, ammonia ($NH_3$) in gaseous form, urea ($CH_4N_2O$) and/or an ammonium solution ($NH_4^+$) is injected at suitable places into the plant for producing cement. The ammonia ($NH_3$), the urea ($CH_4N_2O$) and/or the ammonium solution ($NH_4^+$) is intended to react, at an appropriate residence time and in the correct temperature window, with the nitrogen oxides ($NO_x$) in the exhaust air from the rotary tube furnace, which flows through the entire plant, and form nitrogen ($N_2$) and water ($H_2O$) from ammonia ($NH_3$) and nitrogen oxides ($NO_x$). As a suitable place, the top of a calciner has been selected for this purpose in the prior art. However, the high flow velocities and the large diameter of the plant (from 4 m to 8 m) and also the high loading of the gases conveyed through the plant with raw meal make quantitative reaction of the nitrogen oxides ($NO_x$) difficult to control. The residence time and the flow, and also the interfering dust atmosphere, make denitrification by means of ammonia ($NH_3$) in a plant for producing cement difficult to control. Either nitrogen oxide breakthrough ($NO_x$), ammonia breakthrough ($NH_3$) and/or nitrous oxide breakthrough ($N_2O$), sometimes even isocyanic acid breakthrough (HNCO), is obtained and the total gases conveyed in the plant are denitrified by means of ammonia ($NH_3$), urea ($CH_4N_2O$) or ammonium compounds ($NH_4^+X^-$) for only an unsatisfactory part of the time. In the remaining time, the abovementioned breakthrough takes place. In addition, the combustion in the plant for producing cement is deliberately carried out stepwise, as a result of which a change from a chemically oxidative environment and a reductive environment occurs, forcing a reaction of carbon monoxide (CO) with the nitrogen oxides ($NO_x$) to form nitrogen ($N_2$) and carbon dioxide ($CO_2$). The nitrogen oxides ($NO_x$) are chemically reduced by means of carbon monoxide (CO). Denitrification by means of the SNCR process for total denitrification of the entire exhaust gases from the plant has thus hitherto not been successful to a satisfactory extent.

Denitrification of the total exhaust gases by means of the SNCR process is thus also not a feasible route.

Concentration on the denitrification of the rotary tube furnace exhaust gases which are loaded with high levels of nitrogen oxides ($NO_x$) by means of the SNCR process is also not a feasible route because the required temperature window from about 950° C. to 1000° C. is not attained in the bypass exhaust gas. Although not inconsiderable conversion takes place at lower temperatures, quantitative chemical reduction of the nitrogen oxides does not take place below the temperature window from about 950° C. to 1000° C. Furthermore, the bypass exhaust gas has to be cooled strongly in order to condense out alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$). It would be conceivable to firstly denitrify the bypass exhaust gas by means of the SNCR process and then condense out the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$). However, this would require heating of the bypass exhaust gases and require the process of denitrification to be carried out in the presence of the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth sulfates ($Li_2SO_4$, $Na_2SO_4$, $K_2SO_4$, $MgSO_4$, $CaSO_4$) present in the gas space, which in turn leads to breakthrough of ammonia ($NH_3$), nitrogen oxides ($NO_x$) and/or nitrous oxide ($N_2O$), and possibly isocyanic acid breakthrough (HNCO).

Even though the removal of alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) from bypass exhaust gases represents a relatively small problem today, the associated necessity of denitrification and avoidance of the emission of dioxins and furans continues to be in need of improvement.

It is therefore an object of the invention to provide a process for the denitrification of bypass exhaust gases.

SUMMARY OF THE INVENTION

This object of the invention is achieved by cooling of the bypass exhaust gas to a temperature in the range from 260° C. to 400° C., preferably from 280° C. to 380° C., in a cooling apparatus, preferably by mixing of the bypass exhaust gas with air and/or water in a bypass mixing chamber, injection of an ammonia- ($NH_3$), urea- ($CH_4N_2O$) and/or ammonium-containing ($NH_4^+$) substance into the cooled bypass exhaust gas, where the ammonia ($NH_3$), the urea ($CH_4N_2O$) and/or the ammonium ($NH_4^+$) at least partially converts the free-radical gas constituents present in the cooled bypass exhaust gas (112, 21, 312), for example nitrous gases and free-radical chlorine-oxygen compounds into non-free-radical gas constituents by hydrolysis and/or partial oxidation and/or partial reduction, introduction of the cooled bypass exhaust gas which has been mixed with ammonia- ($NH_3$), urea- ($CH_4N_2O$) and/or ammonium-containing ($NH_4^+$) substance into a ceramic filter arrangement in which lithium fluoride (LiF), lithium chloride (LiCl), sodium fluoride (NaF), sodium chloride (NaCl), potassium chloride (KCl), lithium sulfate ($Li_2SO_4$), sodium sulfate ($Na_2SO_4$), potassium sulfate ($K_2SO_4$) and possibly further halides ($I^-$) and sulfates ($SO_4^-$) of the alkali metals (Li, Na, K) and alkaline earth metals (Mg, Ca) which has/have precipitated during prior cooling of the bypass exhaust gas are filtered out, nitrogen oxide ($NO_x$) which has not been reduced by means of the ammonia- ($NH_3$) and/or ammonium-containing ($NH_4$) substance is chemically selectively reduced (SCR, selective catalytic reduction) over a catalyst present in the ceramic filter arrangement and/or present directly downstream of the ceramic filter arrangement in the presence of the ammonia- ($NH_3$), urea- ($CH_4N_2O$) and/or ammonium-containing ($NH_4$) substance, where, for the chemically selective reduction, the catalyst is arranged on filter elements of the ceramic filter arrangement, on a separate support integrated into the ceramic filter arrangement and/or directly downstream of the ceramic filter arrangement in a dedicated reactor.

The invention thus provides for the bypass exhaust gas taken off from the rotary tube furnace inlet chamber, which itself has a high proportion of alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) in the gas space, to be firstly quenched in a cooling apparatus. The cooling of the bypass exhaust gases preferably takes place in a mixing chamber in which the hot bypass exhaust gases are intimately mixed with fresh atmospheric air or with water. Here, the hot bypass exhaust gases are cooled to a temperature of from 260° C. to 400° C., preferably from 280° C. to 380° C. With this strong cooling, the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) resublime and are present as dust together with raw meal in the bypass exhaust gas. The cooled air, which has a high dust content, is then mixed with an ammonia- ($NH_3$), urea- ($CH_4N_2O$) and/or ammonium-containing ($NH_4^+$) substance by, for example, introducing gaseous ammonia gas ($NH_3$), an aqueous urea solution ($CH_4N_2O$) or an aqueous ammonium solution ($NH_4^+$) into the bypass gas which has been cooled to a temperature in the range from 260° C. to 400° C., preferably from 280° C. to 380° C. At this temperature, which is significantly too low for the SNCR reaction, only partial to little conversion of nitrogen oxides ($NO_x$) takes place. However, reactive constituents of the gas such as the nitrogen oxides ($NO_x$), free chlorine ($Cl_2$) and possibly free-radical gas constituents such as nitrous gases and free-radical chlorine-oxygen compounds, which could, without later catalytic reaction, otherwise lead to increased formation of dioxins and furans, are scavenged by the injection of water for quenching and by the injection of ammonia- ($NH_3$), urea- ($CH_4N_2O$) and/or ammonium-containing ($NH_4^+$) substance. In addition, heavy metals, halogens and sulfur and also carbon monoxide can be present in the bypass exhaust gas, although carbon monoxide is not normally to be expected in the bypass exhaust gas because of the oxidative conditions in the rotary tube furnace but is nevertheless occasionally found there, and these can poison the subsequent catalysts. However, the partial reaction and hydrolysis involving a very complex sequential chemistry of short-lived and reactive compounds leads to the classical catalyst poisons being masked by chemical reactions.

The residence time of the ammonia- ($NH_3$), urea- ($CH_4N_2O$) and/or ammonium-containing ($NH_4^+$) substance in the cooled bypass gas should be sufficiently long for a considerable proportion of the free-radical gas constituents such as nitrous gases and free-radical chlorine-oxygen compounds to be reacted. The injection of an ammonia- ($NH_3$), urea- ($CH_4N_2O$) and/or ammonium-containing ($NH_4^+$) substance and the joint residence time in a line is followed by introduction of the mixed gas composed of ammonia- ($NH_3$), urea- ($CH_4N_2O$) and/or ammonium-containing ($NH_4^+$) substance and the cooled, still dust-containing bypass exhaust gas into a ceramic filter arrangement. This filter arrangement is made of ceramic because the ideal temperature window from 260° C. to 400° C., preferably from 280° C. to 380° C., for an SCR reaction (selective catalytic reduction) is too high for use of an alternative and cheaper cloth filter for removing the dust, namely raw meal and condensed-out alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$). The use of a ceramic filter, which is certainly more expensive than the use of cloth filters, can nevertheless be justified economically because catalysts which catalyze the reaction of the ammonia- ($NH_3$), urea- ($CH_4N_2O$) and/or ammonium-containing ($NH_4^+$) substance with the nitrogen oxides ($NO_x$) in the bypass exhaust gases can be used on the filter surface of the ceramic filter. Usable catalysts can be of various types. One type of catalyst consists essentially of titanium dioxide ($TiO_2$), vanadium pentoxide ($V_2O_5$) and tungsten dioxide ($WO_2$) or mixed catalysts composed of these. The other type of catalysts consists of zeolites. Catalysts composed of ($TiO_2$), vanadium pentoxide ($V_2O_5$) and tungsten dioxide ($WO_2$) or mixed catalysts composed of these also oxidize ($F_2$, $Cl_2$, $I_2$) elemental mercury (Hg), which is possibly present in bypass exhaust gases, in the presence of gaseous halogens ($F_2$, $Cl_2$, $I_2$), and the mercury can then be more readily be separated off in the scrubbers of the flue gas desulfurization plants or in the filters and only a relatively small proportion (about 10%) is released into the surroundings. A further advantage of the use of titanium dioxide ($TiO_2$), vanadium pentoxide ($V_2O_5$) and tungsten dioxide ($WO_2$) or mixed catalysts composed of these is that these catalysts suppress the formation of dioxins (chlorinated and polychlorinated dibenzodioxins) and furans (chlorinated and polychlorinated dibenzofurans) in the presence of gaseous halogens ($F_2$, $Cl_2$, $I_2$). In order not to poison these metallic catalysts, prior partial reaction of the bypass exhaust gas with water and ammonia- ($NH_3$), urea- ($CH_4N_2O$) and/or ammonium-containing ($NH_4^+$) substance is advantageous. The zeolite-based catalysts are generally cheaper to buy and are less sensitive to abrasion and poisoning. However, they have the disadvantage that the formation of dioxins and furans is not suppressed so well. Zeolite-based catalysts promote the decomposition of dioxins and furans to a lesser extent than the metallic catalysts mentioned. The more economically advantageous and more robust, zeolite-based catalysts can therefore be used when removal of the halides from the bypass exhaust gas has taken place beforehand in the ceramic filter.

In an embodiment of the process of the invention, the catalyst comprises titanium dioxide ($TiO_2$), vanadium pentoxide ($V_2O_5$) and tungsten dioxide ($WO_2$) or is a mixed catalyst composed of these which degrades dioxins (chlorinated and polychlorinated dibenzodioxins) and furans (chlorinated and polychlorinated dibenzofurans).

In a further embodiment of the process of the invention, the residence time of the cooled bypass exhaust gases in a line between the cooling apparatus and the ceramic filter arrangement is selected so that the ammonia- ($NH_3$), urea- ($CH_4N_2O$) and/or ammonium-containing ($NH_4^+$) substance converts the free-radical gas constituents such as nitrous gases and free-radical chlorine-oxygen compounds present in the cooled bypass gas into non-free-radical gas constituents to an extent of 50% by hydrolysis and/or partial oxidation and/or partial reduction, preferably to an extent of at least 70%, particularly preferably to an extent of at least 95%.

Corresponding to the process according to the invention, a plant is proposed for producing cement clinker, where the plant has, in the gas flow direction, a rotary tube furnace for sintering of the cement clinker, and where the rotary tube furnace is connected via a rotary tube furnace inlet chamber to a calciner for deacidification of raw meal or to a rotary tube furnace riser shaft, and in which a bypass exhaust gas is taken off in the region of the rotary tube furnace inlet chamber, characterized by in that an apparatus is provided for cooling of the bypass exhaust gas, which apparatus cools the bypass exhaust gas to a temperature in the range from 260° C. to 400° C., preferably in the range from 280° C. to 380° C., preferably a mixing chamber, which mixes the bypass exhaust gas with air and/or water, in that an apparatus for injection of an ammonia- ($NH_3$), urea- ($CH_4N_2O$) and/or ammonium-containing ($NH_4^+$) substance into the cooled bypass exhaust gas is provided downstream thereof, where the ammonia ($NH_3$), the urea ($CH_4N_2O$) or the ammonium ($NH_4^+$) at least partially converts the free-radical gas constituents present in the cooled bypass exhaust gas, for example nitrous gases and free-radical chlorine-oxygen compounds, into non-free-radical gas constituents by hydrolysis and/or partial oxidation and/or partial reduction, in that a ceramic filter arrangement which filters out the lithium fluoride (LiF), lithium chloride (LiCl), sodium fluoride (NaF), sodium chloride (NaCl), potassium chloride (KCl), lithium sulfate ($Li_2SO_4$), sodium sulfate ($Na_2SO_4$), potassium sulfate ($K_2SO_4$) and possibly further halides ($I^-$) and sulfates ($SO_4^-$) of the alkali metals (Li, Na, K) and alkaline earth metals (Mg, Ca) precipitated during the prior cooling of the bypass exhaust gas, and chemically selectively reduces (SCR, selective catalytic reduction) the nitrogen oxide ($NO_x$) which has not yet been reduced by the ammonia- ($NH_3$), urea- ($CH_4N_2O$) and/or ammonium-containing ($NH_4^+$) substance over a catalyst present in the ceramic filter arrangement and/or present directly downstream of the ceramic filter arrangement, where the catalyst is arranged on filter elements of the ceramic filter arrangement, on a separate support integrated in the ceramic filter arrangement, and/or directly downstream of the ceramic filter arrangement in a dedicated reactor.

In an embodiment of the plant of the invention, the catalyst comprises titanium dioxide ($TiO_2$), vanadium pentoxide ($V_2O_5$) and tungsten dioxide ($WO_2$) or is a mixed catalyst made up of these which degrades dioxins (chlorinated and polychlorinated dibenzodioxins) and furans (chlorinated and polychlorinated dibenzofurans).

In a further embodiment of the plant of the invention, the residence time of the cooled bypass exhaust gases in the line between the cooling apparatus and the ceramic filter arrangement is selected by design of a line so that the ammonia- ($NH_3$), urea- ($CH_4N_2O$) and/or ammonium-containing ($NH_4^+$) substance converts the free-radical gas constituents such as nitrous gases and free-radical chlorine-oxygen compounds present in the cooled bypass gas into non-free-radical gas constituents to an extent of 50% by hydrolysis and/or partial oxidation and/or partial reduction, preferably to an extent of at least 70%, particularly preferably to an extent of at least 95%.

BRIEF DESCRIPTION OF THE DRAWINGS

The invention will be illustrated with the aid of the following figures, in which.

DETAILED DESCRIPTION OF THE PREFERRED EMBODIMENTS

Figure 1:
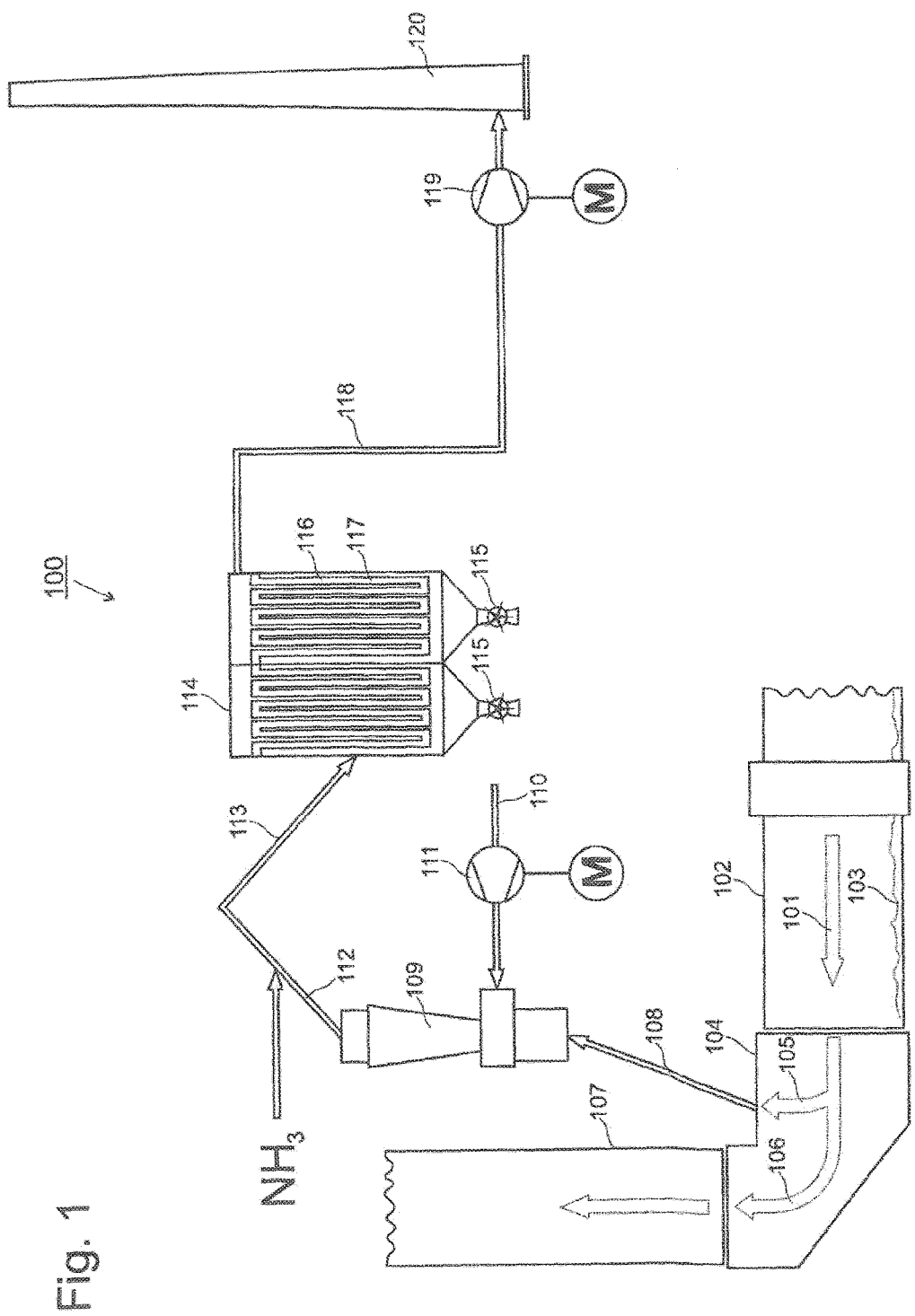
FIG. 1 shows a flow diagram of a first plant configuration for carrying out the process of the invention.

FIG. 1 shows a flow diagram 100 of a first plant configuration for carrying out the process of the invention. The in-principle structure of a plant for producing cement will here be assumed to be known. Hot combustion gases 101 pass through a rotary tube furnace 102 and heat this for sintering of the cement clinker 103 present in the rotary tube furnace 102. The combustion gases 101 leave the rotary tube furnace 102 at the left-hand end where the rotary tube furnace 102 opens into a rotary tube furnace inlet chamber 104. In the rotary tube furnace inlet chamber 104, the combustion gases cool to a great extent because they impinge there on gases from a heat exchanger (not shown here). On cooling of the combustion gases 101, alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) condense and are, following the gas stream 105, taken off as bypass exhaust gases from the rotary tube furnace inlet chamber 104. The remaining rotary tube furnace exhaust gases 101 follow the gas stream 106 and ascend in the calciner 107 or the rotary tube furnace riser shaft. The bypass exhaust gas follows the gas stream 108 into an apparatus for cooling to a temperature in the range from 260° C. to 400° C., preferably from 280° C. to 380° C. In the present case, the cooling apparatus is a mixing chamber 109 which intimately mixes the bypass exhaust gas from gas stream 108 with atmospheric air 110 or with water, with the atmospheric air 110 or the water being blown into the mixing chamber 109 by means of a motor-driven compressor 111. At the upper outlet of the mixing chamber 109, the bypass exhaust gas has the desired temperature of from 280° C. to 380° C. To compensate for the temperature drop resulting from the injection of ammonia- ($NH_3$), urea- ($CH_4N_2O$) and/or ammonium-containing ($NH_4^+$) substance, in FIG. 1 designated as "$NH_3$" for all types of injection of ammonia- ($NH_3$), urea- ($CH_4N_2O$) and/or ammonium-containing ($NH_4^+$) substance, the exit temperature at the mixing chamber can also be so high that the mixed gases 112 in the line 113 have the desired temperature of from 260° C. to 400° C., preferably from 280° C. to 380° C. Line 113 leads to a ceramic filter arrangement 114 in which the condensed and solidified or resublimed alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$) are filtered out from the gas stream and are removed continuously or discontinuously via the star feeders 115 from the filter arrangement 114. In the present plant configuration, a catalyst 116 has been applied to ceramic filter elements 117 in order to react the nitrogen oxides and the further undesirable gas constituents in the bypass exhaust gas. When a combination of ceramic filter elements 117 and catalyst 116 is employed, it is advantageous for the catalyst 116 to comprise titanium dioxide ($TiO_2$), vanadium pentoxide ($V_2O_5$) and tungsten dioxide ($WO_2$) or be a mixed catalyst composed of these which suppresses the formation of dioxins (chlorinated and polychlorinated dibenzodioxins) and furans (chlorinated and polychlorinated dibenzofurans). This is because chlorine ($Cl_2$) or chlorine compounds are possibly present in the immediate vicinity of carbon compounds such as carbon dioxide ($CO_2$), carbon monoxide (CO) and possibly soot ($C_x$) and also in the immediate vicinity of oxygen ($O_2$) from atmospheric air are possibly present in this place. In order to prevent dioxins or furans from being formed in this place, the metallic catalysts are used because these promote the decomposition of the dioxins and the furans. The exhaust gas from the filter arrangement is then discharged into the free atmosphere via a line 118 by means of an appropriately connected, motor-driven compressor 119 via a stack 120.

Figure 2:
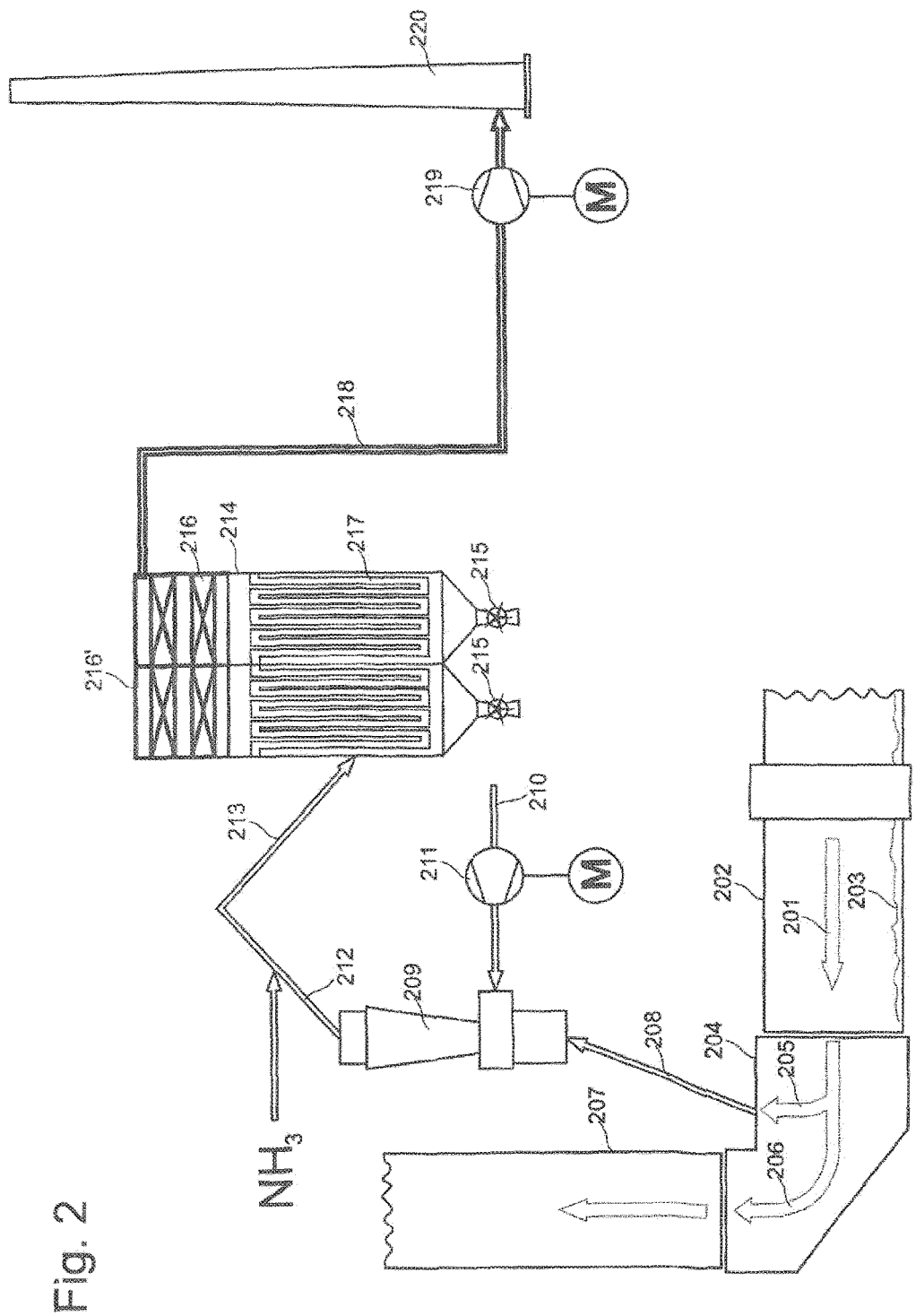
FIG. 2 shows a flow diagram of a second plant configuration for carrying out the process of the invention.

A plant configuration 200 which is an alternative to the plant configuration in FIG. 1 is shown in FIG. 2. The elements which are changed compared to the plant configuration 100 in FIG. 1 are emphasized by bold print in FIG. 2. Essentially, the same process steps as in FIG. 1 proceed in this plant configuration 200, with the difference that although the catalyst 216 is integrated into the filter arrangement 214, the catalyst 216 is nevertheless separated spatially on a support 216' from the filter elements 217. In this way, the catalyst 216 does not come into direct contact with the dust to be filtered out. The action of the catalyst is as a result not reduced by dust deposits and dioxin and furan formation is reduced further because the halogens present essentially as solid halides, in particular chlorides, are kept away from the catalyst. Only gaseous halides, for example chlorine ($Cl_2$), remain in the gas when it has not been reacted in line 212 downstream of the mixing chamber 209 on injection of ammonia- ($NH_3$), urea- ($CH_4N_2O$) and/or ammonium-containing ($NH_4^+$) substance. As long as gaseous halogens, here essentially chlorine, have already been separated off chemically as halides, it is also possible for the catalyst 216 in the separate arrangement of ceramic filter elements 217 and catalyst 216 to be based on zeolite, which may be economically more advantageous and rapid catalyst poisoning is not to be expected. After passage through the unit containing the catalysts 216, the bypass exhaust gas leaves the plant via line 218 and is discharged into the free atmosphere via the motor-driven compressor 219 and via the stack 220.

Figure 3:
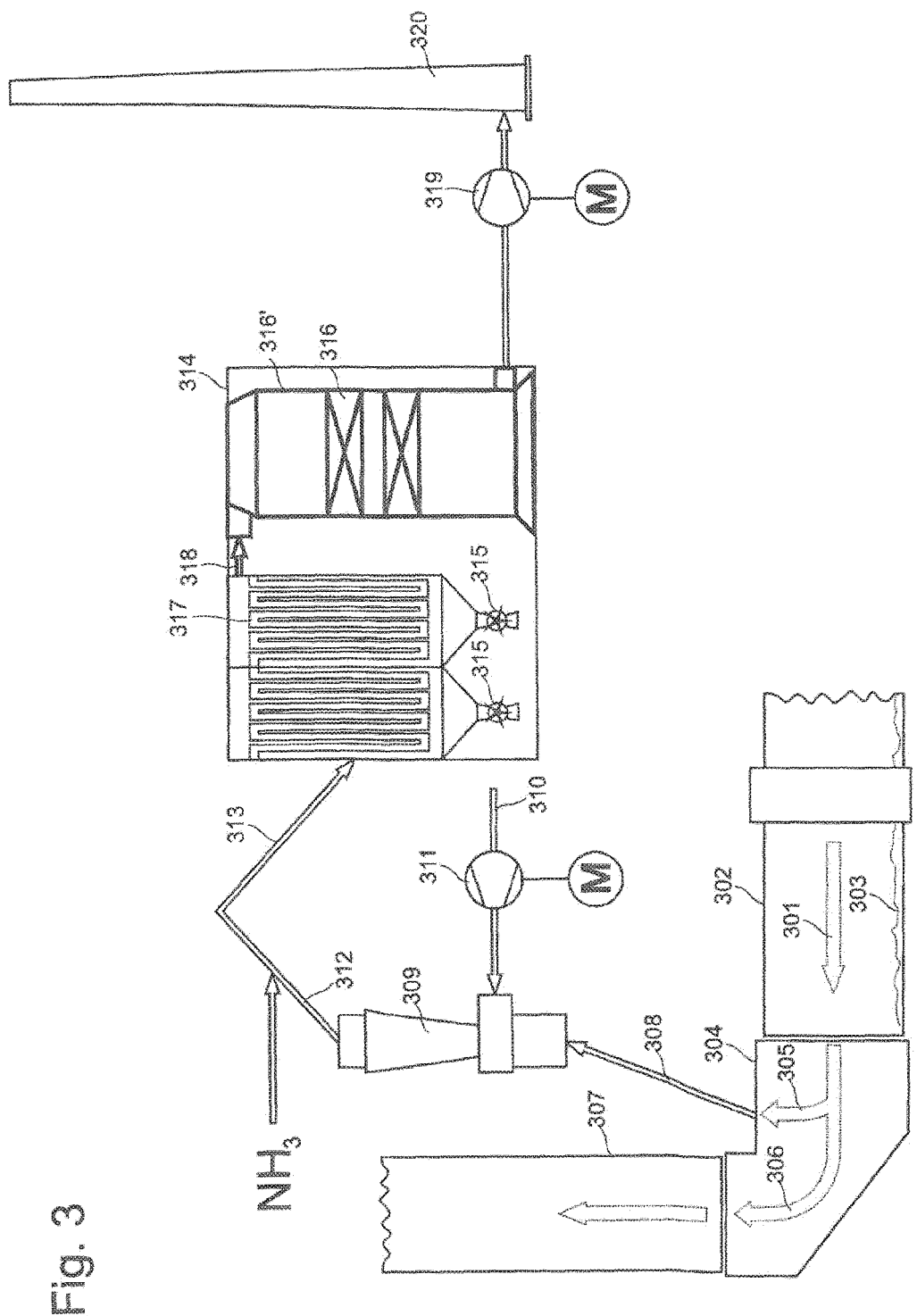
FIG. 3 shows a flow diagram of a third plant configuration for carrying out the process of the invention.

Finally, FIG. 3 shows a further plant configuration 300 which differs from the previous configurations in that it has a separate catalyst 316. This separate catalyst 316 is accommodated in a dedicated reactor 316' as part of the ceramic filter arrangement 314, which although it is more complex in structural terms is easier to handle for maintenance. The complete separation of the filter elements 317 allows use of virtually any catalysts because the separation makes dust-free operation of the catalyst 316 possible, as a result of which less dust deposition, poisoning and also less catalysis of the degradation of dioxins or furans are to be expected.

The invention essentially makes use of the idea of firstly cooling the bypass exhaust gas in order to precipitate the alkali metal halides (LiF, LiCl, LiI, NaF, NaCl, NaI, KF, KCl, KI) and alkaline earth metal halides ($MgF_2$, $MgCl_2$, $MgI_2$, $CaF_2$, $CaCl_2$, $CaI_2$) and alkali metal and alkaline earth metal sulfates ($Li_2SO_4$, $Na_2SO_4$, $K_2SO_4$, $MgSO_4$, $CaSO_4$). Only then does catalytic conversion of the undesirable nitrogen oxides by means of an SCR process take place. Since the SCR process would not be able to be used if conventional cloth filters were to be used because the cloth filters would not withstand the temperature, a ceramic filter is used according to the invention. The economic disadvantage of the ceramic filter compared to a cloth filter is, however, balanced by the ceramic filter simultaneously being able to serve as support for the catalyst. In order to remove the pollutants virtually quantitatively, the reducing agent, the ammonia- ($NH_3$), urea- ($CH_4N_2O$) and/or ammonium-containing ($NH_4^+$) substance, resides with the cooled bypass exhaust gas before dust removal and removal of the halides and sulfates.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

| | |
|---|---|
| 100 | Plant configuration |
| 101 | Combustion gases |
| 102 | Rotary tube furnace |
| 103 | Cement clinker |
| 104 | Rotary tube furnace inlet chamber |
| 105 | Gas stream |
| 106 | Gas stream |
| 107 | Calciner |
| 108 | Gas stream |
| 109 | Mixing chamber |
| 110 | Atmospheric air/water |
| 111 | Compressor |

| | |
|---|---|
| 112 | Mixed gases |
| 113 | Line |
| 114 | Filter arrangement |
| 115 | Star feeder |
| 116 | Catalyst |
| 117 | Filter elements |
| 118 | Line |
| 119 | Compressor |
| 120 | Stack |
| 200 | Plant configuration |
| 201 | Combustion gases |
| 202 | Rotary tube furnace |
| 203 | Cement clinker |
| 204 | Rotary tube furnace inlet chamber |
| 205 | Gas stream |
| 206 | Gas stream |
| 207 | Calciner |
| 208 | Gas stream |
| 209 | Mixing chamber |
| 201 | Atmospheric air/water |
| 211 | Compressor |
| 212 | Mixed gases |
| 213 | Line |
| 214 | Filter arrangement |
| 215 | Star feeder |
| 216 | Catalyst |
| 216' | Support |
| 217 | Filter elements |
| 118 | Line |
| 119 | Compressor |
| 220 | Stack |
| 300 | Plant configuration |
| 301 | Combustion gases |
| 302 | Rotary tube furnace |
| 303 | Cement clinker |
| 304 | Rotary tube furnace inlet chamber |
| 305 | Gas stream |
| 306 | Gas stream |
| 307 | Calciner |
| 308 | Gas stream |
| 309 | Mixing chamber |
| 310 | Atmospheric air/water |
| 311 | Compressor |
| 312 | Mixed gases |
| 313 | Line |
| 314 | Filter arrangement |
| 315 | Star feeder |
| 316 | Catalyst |
| 316' | Reactor |
| 317 | Filter elements |
| 318 | Line |
| 319 | Compressor |
| 320 | Stack |

The invention claimed is:

1. A process for the denitrification of bypass exhaust gases in a plant for producing cement clinker,
where the plant has, in the gas flow direction, a rotary tube furnace upstream of a calciner for sintering of the cement clinker, and
where the rotary tube furnace is connected via a rotary tube furnace inlet chamber to the calciner for deacidification of raw meal or to a rotary tube furnace riser shaft, and
where the bypass exhaust gas is taken off in the region of the rotary tube furnace inlet chamber, comprising the steps:
cooling the bypass exhaust gas to a temperature in the range from 260° C. to 400° C. in a cooling apparatus,
injecting at least one of an ammonia-, urea- or ammonium-containing substance into the cooled bypass exhaust gas,
where the at least one of the ammonia, the urea or the ammonium at least partially converts the free-radical gas constituents present in the cooled bypass gas into non-free-radical gas constituents by at least one of hydrolysis, partial oxidation, or partial reduction,
introducing the cooled bypass exhaust gas which has been mixed with the at least one of ammonia-, urea-, or ammonium-containing substance into a ceramic filter arrangement in which
a) at least one of lithium fluoride, lithium chloride, sodium fluoride, sodium chloride, potassium chloride, lithium sulfate, sodium sulfate, potassium sulfate or halides in the form of iodides and sulfates of the alkaline earth metals Mg and Ca which has precipitated during prior cooling of the bypass exhaust gas is filtered out, and
b) nitrogen oxides which have not yet been converted by means of the at least one of ammonia-, urea- and/or ammonium-containing substance are chemically selectively reduced over a catalyst present at least one of in the ceramic filter arrangement or directly downstream of the ceramic filter arrangement,
where the catalyst for the chemically selective reduction is arranged at least one of
c) on filter elements of the ceramic filter arrangement,
d) on a separate support integrated into the ceramic filter arrangement, or
e) directly downstream of the ceramic filter arrangement in a dedicated reactor.

2. The process as claimed in claim 1, wherein the catalyst comprises at least one of titanium dioxide, vanadium pentoxide or tungsten dioxide, which degrades dioxins and furans.

3. The process as claimed in claim 1, wherein the residence time of the cooled bypass exhaust gases in a line between the cooling apparatus and the ceramic filter arrangement is selected so that the ammonia-, urea-, or ammonium-containing substance converts free-radical gas constituents present in the cooled bypass gas into non-free-radical gas constituents to an extent of 50% by at least one of hydrolysis, partial oxidation, or partial reduction.

4. The process as claimed in claim 3, wherein the free-radical gas constituents present in the cooled bypass gas are converted into non-free radical gas constituents to an extent of at least 70%.

5. The process as claimed in claim 3, wherein the free-radical gas constituents present in the cooled bypass gas are converted into non-free radical gas constituents to an extent of at least 95%.

6. The process as claimed in claim 1, wherein the cooling of the bypass exhaust gas is conducted to a temperature in the range from 280° C. to 380° C.

7. The process as claimed in claim 1, further comprising mixing the bypass exhaust gas with at least one of air or water in a mixing chamber.

8. A plant for producing cement clinker, comprising:
in a gas flow direction, a rotary tube furnace upstream of a calciner for sintering the cement clinker and
the rotary tube furnace being connected via a rotary tube furnace inlet chamber to the calciner for deacidification of raw meal or to a rotary tube furnace riser shaft,
a bypass exhaust gas being taken off in a region of the rotary tube furnace inlet chamber,
an apparatus for cooling of the bypass exhaust gas, the apparatus being configured to cool the bypass exhaust gas to a temperature in the range from 260° C. to 400° C., an apparatus configured to inject an ammonia-, urea- or ammonium-containing substance into the cooled bypass exhaust gas arranged downstream of the apparatus for cooling of the bypass exhaust gas, where the ammonia, the urea or the ammonium at least partially converts the free-radical gas constituents present in the cooled bypass gas into non-free-radical gas constituents by at least one of hydrolysis, partial oxidation, or partial reduction, a ceramic filter arrangement located downstream of the apparatus for cooling the bypass exhaust gas being configured to
  a) filter out at least one of lithium fluoride, lithium chloride, sodium fluoride, sodium chloride, potassium chloride, lithium sulfate, sodium sulfate, potassium sulfate, or further halides in the form of iodides and sulfates of the alkaline earth metals Mg and Ca precipitated during the prior cooling of the bypass exhaust gas, and
  b) chemically selectively reduce the nitrogen oxides which have not yet been converted by means of the ammonia-, urea- or ammonium-containing substance over a catalyst present at least one of in the ceramic filter arrangement or present directly downstream of the ceramic filter arrangement, where the catalyst is arranged at least one of
  c) on filter elements of the ceramic filter arrangement,
  d) on a separate support integrated into the ceramic filter arrangement, or
  e) directly downstream of the ceramic filter arrangement in a dedicated reactor.

9. The plant as claimed in claim 8, wherein the catalyst comprises at least one of titanium dioxide, vanadium pentoxide, or tungsten dioxide which degrades dioxins and furans.

10. The plant as claimed in claim 8, wherein the line between the cooling apparatus and the ceramic filter arrangement is configured so that a residence time of the cooled bypass exhaust gases is such that the at least one of the ammonia-, urea- or ammonium-containing substance converts the free-radical gas constituents present in the cooled bypass gas into non-free-radical gas constituents to an extent of 50% by at least one of hydrolysis, partial oxidation, or partial reduction.

11. The plant as claimed in claim 10, wherein the line between the cooling apparatus and the ceramic filter arrangement is configured so that the residence time of the cooled bypass exhaust gases is such that the at least one of the ammonia-, urea- or ammonium-containing substance converts the free-radical gas constituents present in the cooled bypass gas into non-free-radical gas constituents to an extent of at least 70%.

12. The plant as claimed in claim 10, wherein the line between the cooling apparatus and the ceramic filter arrangement is configured so that the residence time of the cooled bypass exhaust gases is such that the at least one of the ammonia-, urea- or ammonium-containing substance converts the free-radical gas constituents present in the cooled bypass gas into non-free-radical gas constituents to an extent of at least 95%.

13. The plant as claimed in claim 8, wherein the apparatus for cooling the bypass exhaust gas is configured to cool the bypass gas to a temperature in the range from 280° C. to 380° C.

14. The plant as claimed in claim 8, wherein a mixing chamber is configured to mix the bypass exhaust gas with at least one of atmospheric air or water.

* * * * *